US009624947B2

(12) United States Patent
Burgett et al.

(10) Patent No.: US 9,624,947 B2
(45) Date of Patent: Apr. 18, 2017

(54) ELECTRONIC CONTROLLER WITH INTEGRAL VENT VALVE (71) Applicant: TESCOM CORPORATION, Elk River, MN (US)

(72) Inventors: Eric Jacob Burgett, Maple Grove, MN (US); Brian J. Tutt, Brainerd, MN (US)

(73) Assignee: TESCOM CORPORATION, Elk River, MN (US)

( * ) Notice: Subject to any disclaimer, the term of this patent is extended or adjusted under 35 U.S.C. 154(b) by 79 days.

(21) Appl. No.: 14/166,402

(22) Filed: Jan. 28, 2014

(65) Prior Publication Data
US 2015/0211552 A1    Jul. 30, 2015

(51) Int. Cl.
F16K 31/12     (2006.01)
F15B 13/02     (2006.01)
G05D 16/20     (2006.01)
G05B 19/045    (2006.01)

(52) U.S. Cl.
CPC .......... F15B 13/025 (2013.01); G05B 19/045 (2013.01); G05D 16/2026 (2013.01); G05D 16/2093 (2013.01); G05B 2219/25312 (2013.01); Y10T 137/86614 (2015.04)

(58) Field of Classification Search
CPC ........ G05B 19/045; G05B 2219/25312; G05D 16/20; G05D 16/2026; G05D 16/2093; Y10T 137/88614; F15B 13/025
USPC ................ 137/14, 487.5, 583, 589
See application file for complete search history.

(56) References Cited

U.S. PATENT DOCUMENTS

| 2,202,286 | A | * | 5/1940 | Gorrie ............................. 137/14 |
| 2,701,578 | A | * | 2/1955 | Hamilton .................. 137/116.5 |
| 3,726,296 | A | * | 4/1973 | Friedland et al. ................ 137/1 |
| 4,722,360 | A | * | 2/1988 | Odajima et al. .......... 137/487.5 |
| 4,926,901 | A | * | 5/1990 | Waltenburg .................. 137/456 |
| 4,961,441 | A | * | 10/1990 | Salter .............................. 137/14 |
| 5,178,177 | A | * | 1/1993 | Scott .............................. 137/14 |
| 5,425,270 | A | * | 6/1995 | McDonald et al. ........... 73/168 |

(Continued)

OTHER PUBLICATIONS

International Search Report and Written Opinion for PCT/US2015/013168, mailed Apr. 21, 2015.

Primary Examiner — Umashankar Venkatesan
(74) Attorney, Agent, or Firm — Marshall, Gerstein & Borun LLP (57) ABSTRACT An electronic regulator includes an inlet valve coupled to an inlet port, the inlet port configured to receive a supply pressure, and an exhaust valve coupled to an exhaust port, the exhaust port configured to release a pilot pressure when the exhaust valve is open. The electronic regulator also includes a pilot pressure output pneumatically coupled to the inlet valve and exhaust valve and configured to be coupled to an external process control device to provide the pilot pressure to the external process control device. A setpoint input coupled to both the inlet valve and the exhaust valve receives a setpoint signal indicative of a setpoint value, and the electronic regulator operates the inlet valve and the exhaust valve to control the pilot pressure according to the setpoint value. Further, the electronic regulator includes a vent valve coupled to a venting port and pneumatically coupled to the pilot pressure output. The venting port is configured to release the pilot pressure according to the safety control signal.

21 Claims, 9 Drawing Sheets (56) References Cited

U.S. PATENT DOCUMENTS

| | | | |
|---|---|---|---|
| 6,077,051 A | 6/2000 | Centers et al. | |
| 6,095,184 A | 8/2000 | Neff et al. | |
| 6,595,231 B1 | 7/2003 | Best | |
| 7,318,447 B2 * | 1/2008 | Law | 137/487.5 |
| 2007/0017573 A1 | 1/2007 | Frampton | |
| 2011/0120567 A1 * | 5/2011 | Kuehne et al. | 137/14 |
| 2013/0118595 A1 | 5/2013 | Neef et al. | |

\* cited by examiner

ELECTRONIC CONTROLLER WITH INTEGRAL VENT VALVE

FIELD OF THE DISCLOSURE

The present disclosure is directed to an electronic pressure regulator for regulating a process control device and, more particularly, to an electronic regulator with an integral vent valve for releasing a pressure from the electronic regulator.

BACKGROUND

Process control systems often employ electronic regulators, such as microprocessor based PID (Proportional, Integral, Derivative) controllers, to precisely control pressures. Electronic regulators can act as standalone units to control the pressure of clean, dry, inert gases, or can be connected to any pneumatically actuated regulator or valve. For example, an electronic regulator may control a pneumatically actuated regulator, via a pilot pressure, to precisely control the pressure in a line leading to a tank or other vessel.

In an emergency situation (e.g., loss of power), or in other situations in which an electronic regulator is to be shutoff, pilot pressure can be trapped within the electronic regulator due to the common use of normally closed inlet and exhaust valves. The trapped pilot pressure may, for example, maintain an actuator at a static position, preventing the actuated valve from moving to its fail safe position (e.g., normally opened or normally closed). To release this pilot pressure, current systems utilize a vent valve disposed in an external adaptor or coupling (e.g., in an adaptor connecting the electronic regulator to a pneumatically actuated regulator). However, such an external vent valve often requires bulky and exposed wiring and introduces additional leak points into the pressure controlled system.

SUMMARY

An electronic regulator comprises an inlet valve disposed within a regulator housing coupled to an inlet port, the inlet port configured to receive a supply pressure, and an exhaust valve disposed within the regulator housing and coupled to an exhaust port, the exhaust port configured to release a pilot pressure when the exhaust valve is open. The electronic regulator also includes a pilot pressure output pneumatically coupled to the inlet valve and exhaust valve and configured to be coupled to an external process control device to provide the pilot pressure to the external process control device, and a setpoint input coupled to both the inlet valve and the exhaust valve and configured to receive a setpoint signal indicative of a setpoint value, wherein the electronic regulator operates the inlet valve and the exhaust valve to control the pilot pressure according to the setpoint value. Still further, the electronic regulator includes a vent valve disposed within the regulator housing and coupled to a venting port and pneumatically coupled to the pilot pressure output, the venting port configured to release the pilot pressure when the vent valve is open, and a safety control input coupled to the vent valve and configured to receive a safety control signal, wherein the vent valve operates to release the pilot pressure according to the safety control signal.

In another embodiment, a system for controlling a regulator outlet pressure comprises an electronic regulator housed in a regulator housing. The electronic regulator comprises an inlet valve disposed within the regulator housing coupled to an inlet port, the inlet port configured to receive a supply pressure, an exhaust valve disposed within the regulator housing and coupled to an exhaust port, the exhaust port configured to release a pilot pressure when the exhaust valve is open, and a pilot pressure output pneumatically coupled to the inlet valve and exhaust valve and coupled to an actuator to provide the pilot pressure to the actuator. The electronic regulator also comprises a setpoint input coupled to both the inlet valve and the exhaust valve and configured to receive a setpoint signal indicative of a setpoint value, wherein the electronic regulator operates the inlet valve and the exhaust valve to control the pilot pressure according to the setpoint value, a vent valve disposed within the regulator housing and coupled to a venting port and pneumatically coupled to the pilot pressure output, the venting port configured to release the pilot pressure when the vent valve is open, and a safety control input coupled to the vent valve and configured to receive a safety control signal, wherein the vent valve operates to release the pilot pressure according to the safety control signal. The system further includes a pressure regulator having a pressure regulator inlet valve, a pressure regulator outlet valve, and a control element, the pressure regulator coupled to the actuator such that the control element controls the regulator outlet pressure according to the pilot pressure of the electronic regulator.

A method of venting a pilot pressure in an electronic regulator housed in a regulator housing comprises receiving at a setpoint input, from a setpoint source, a setpoint signal indicative of a setpoint value, and controlling an inlet valve within the regulator housing and an exhaust valve within the regulator housing, based on the setpoint value, to produce a pilot pressure at a pilot pressure output of the electronic regulator the pilot pressure output pneumatically coupled to the inlet valve and exhaust valve. The method further comprises providing the pilot pressure to an external process control device via the pilot pressure output, receiving, from a safety control source, a safety control signal, and controlling a vent valve within the regulator housing, according to the safety control signal, to release the pilot pressure through a venting port of the electronic regulator.

DETAILED DESCRIPTION

The present disclosure is directed to an electronic regulator with an integral vent valve and, specifically, to an electronic regulator including a vent valve that, when operated, releases a pilot pressure through a venting port. In particular, an electronic regulator includes a vent valve coupled to a venting port and pneumatically coupled to a pilot pressure output of the electronic regulator. According to a safety control signal, the vent valve operates (e.g., opens) to release the pilot pressure through the venting port.

Figure 1:
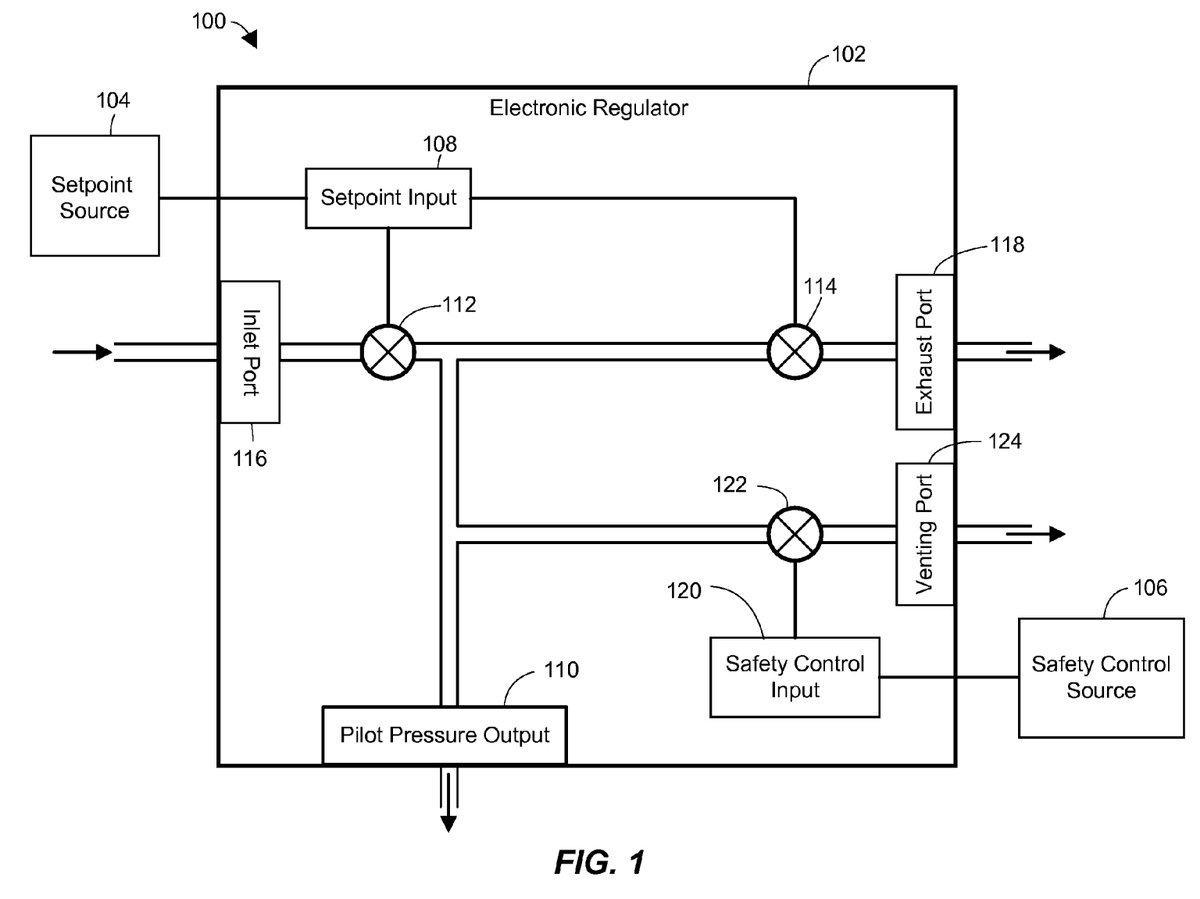
FIG. 1 is a block diagram of an example electronic regulator including an integral vent valve.

Referring now to FIG. 1, an example system 100 constructed in accordance with one embodiment of the present disclosure includes an electronic regulator 102 communicatively coupled to a setpoint source 104 (e.g., a controller) and a safety control source 106 (e.g., a safety controller). The electronic regulator 102 may operate according to a setpoint signal, received from the setpoint source 104 (via a setpoint input 108), to generate a pilot pressure at a pilot pressure output 110. In an implementation, the setpoint signal may be indicative of a setpoint value, and the electronic regulator may operate to either: (i) generate a pilot pressure matching the setpoint value; or (ii) generate a pilot pressure to pneumatically actuate an external controlled regulator so as to match the output of the controlled regulator to the setpoint value. For example, and without limitation, the setpoint signal may include an analog signals from 4-20 mA, 1-5V, or 0-10V analog sources.

To generate a pilot pressure at the pilot pressure output 110, the electronic regulator 102 may operate an inlet valve 112 and an exhaust valve 114. The inlet valve 112 may be coupled to an inlet port 116 to receive a supply pressure (e.g., a nominal pressure value, such as 110 psig/7.5 bar), and the exhaust valve 114 may be coupled to an exhaust port 118 to release some or all of the pilot pressure in the electronic regulator under normal operating conditions. For example, the electronic regulator 102 may open the inlet valve 112 and close the exhaust valve 114 to increase the pilot pressure at the pilot pressure output 110, or the electronic regulator 102 may close the inlet valve 112 and open the exhaust valve 114 to decrease the pilot pressure at the pilot pressure output 110. It is clear that the electronic regulator 102 may operate the inlet valve 112 and the exhaust valve 114 in any suitable manner so as to control the pilot pressure based on the setpoint signal. In some implementations, the electronic regulator 102 may include control logic stored thereon (e.g., in a non-transient computer-readable medium) and executable by one or more microprocessors (not shown) of the electronic regulator 102 to produce the pilot pressure according to a setpoint signal. Such control logic is further discussed with reference to FIG. 2.

The electronic regulator 102 may also operate according to a safety control signal, received from the safety control source 106 (via a safety control input 120), to release the pilot pressure. Specifically, the electronic regulator 102 may operate a vent valve 122 according to the safety control signal to release the pilot pressure through a venting port 124. In some implementations, the inlet valve 112 and the exhaust valve 114 are normally closed valves (i.e., closed upon a loss of power or shutdown) that may trap a pilot pressure upon a loss of power. Thus, operation of the vent valve 122 in an emergency or other shutoff situation allows trapped pilot pressure in the electronic regulator 102 to be vented or released through the venting port 124. In turn, actuated valves, operating based on the pilot pressure, may return to respective fail safe positions (e.g., normally opened or normally closed positions).

Ports, such as the inlet port 116, venting port 124, exhaust port 118, and pilot pressure output 110, may include machined channels in a regulator housing (as further discussed with reference to FIGS. 8A and 8B), pipes, or any other channel through which fluid (e.g., gas) may flow into or out of the electronic regulator 102. Valves, such as the inlet valve 112, exhaust valve 114, and vent valve 122, may include Pulse Width Modulation (PWM) solenoids, globe valves, ball valves, etc. allowing the electronic regulator 102 to selectively control the flow of pressurized fluid into or out of the electronic regulator 102.

In the example system 100, the setpoint source 104 and the safety control source 106 may be independent. That is, the generation of a setpoint signal by the setpoint source 104 may not depend or be influenced by the generation of a safety control signal by the safety control source 106, and vice versa. In this way the vent valve 122 may be operated independently of the rest of the electronic regulator 102 (e.g., the inlet valve 112 and exhaust valve 114). Such independent operation may be advantageous if an operator of a process control system including the electronic regulator 102 desires to vent the electronic regulator 102 without completely shutting down (e.g., turning power off to) the electronic regulator 102. Further, the independent operation of the vent valve 122 may allow the venting of the electronic regulator 102 even when the setpoint source 104 and/or other components (e.g., inlet valve 112 and exhaust valve 114) of the electronic regulator 102 are malfunctioning. That is, operation of the vent valve 122 may be autonomous.

The communicative couplings between the electronic regulator 102 and the setpoint source 104 and safety control source 106 may include any suitable combination of wired and/or wireless connections. For example, the communicative couplings may include Universal Serial Bus (USB), coaxial, twisted-pair, ribbon, etc. cables and/or various wireless connectors or adaptors, such as wireless routers. Further, although not shown in FIG. 1, the communicative couplings between the electronic regulator 102 and the setpoint source 104 and safety control source 106 may include one or more local and or wide area networks, such as the Internet.

The setpoint source 104 and the safety control source 106 may include one or more programmable logic controllers, in an implementation. In general, however, the setpoint source 104 and the safety control source 106 may include any suitable devices, such as desktop, laptop, tablet, etc. computers, configured to supply the electronic regulator 102 with setpoint signals and safety control signals. The setpoint source 104 and/or the safety control source 106 may also include one or more potentiometers. In some cases, the setpoint source 104 and/or the safety control source 106 may include "installed" software applications (e.g., in a computer-readable memory) configured to tune the electronic regulator 102, diagnose errors in an operation of the electronic regulator 102, test functionality of the electronic regulator 102, etc. when executed by one or more computer processors.

Figure 2:
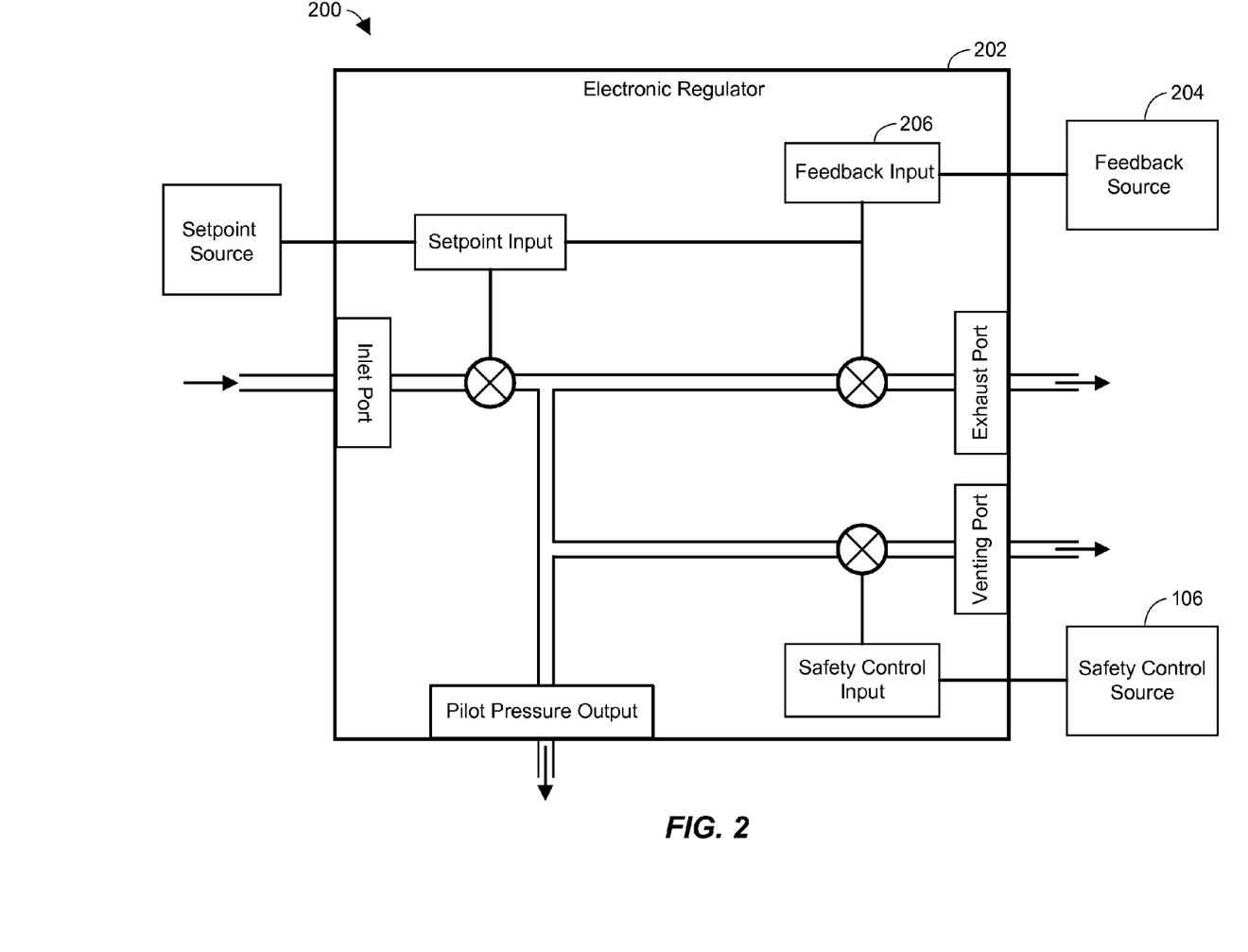
FIG. 2 is a block diagram of another example electronic regulator including an integral vent valve and configured to receive a feedback signal.

FIG. 2 illustrates another example system 200 including an electronic regulator 202. Generally, the electronic regulator 202 includes components similar to the components of electronic regulator 102 (inlet valve, exhaust valve, vent valve, etc.). However, the electronic regulator 202 may also receive a feedback signal from a feedback source 204 via a feedback input 206. The feedback source 204 may include a pressure transducer, or other suitable device, coupled to a pressure controlled line, tank, or other vessel. The feedback source 204 may transmit a feedback signal (e.g., a 4-20 mA or 1-5 VDC signal indicative of a current value of a controlled pressure) to the electronic regulator 202 such that the electronic regulator may control the pilot pressure at least partially based on the feedback signal. Control logic executed by the electronic regulator 202 may generate a pilot pressure based on a control loop feedback mechanism, such as in a Proportional-Integral-Derivative (PID) controller. Although shown external to the electronic regulator 202, it is understood that the feedback source may also include an internal pressure sensor (e.g., 0-100 psig/0-6.9 bar) configured to transmit a current pilot pressure value.

Figure 3:
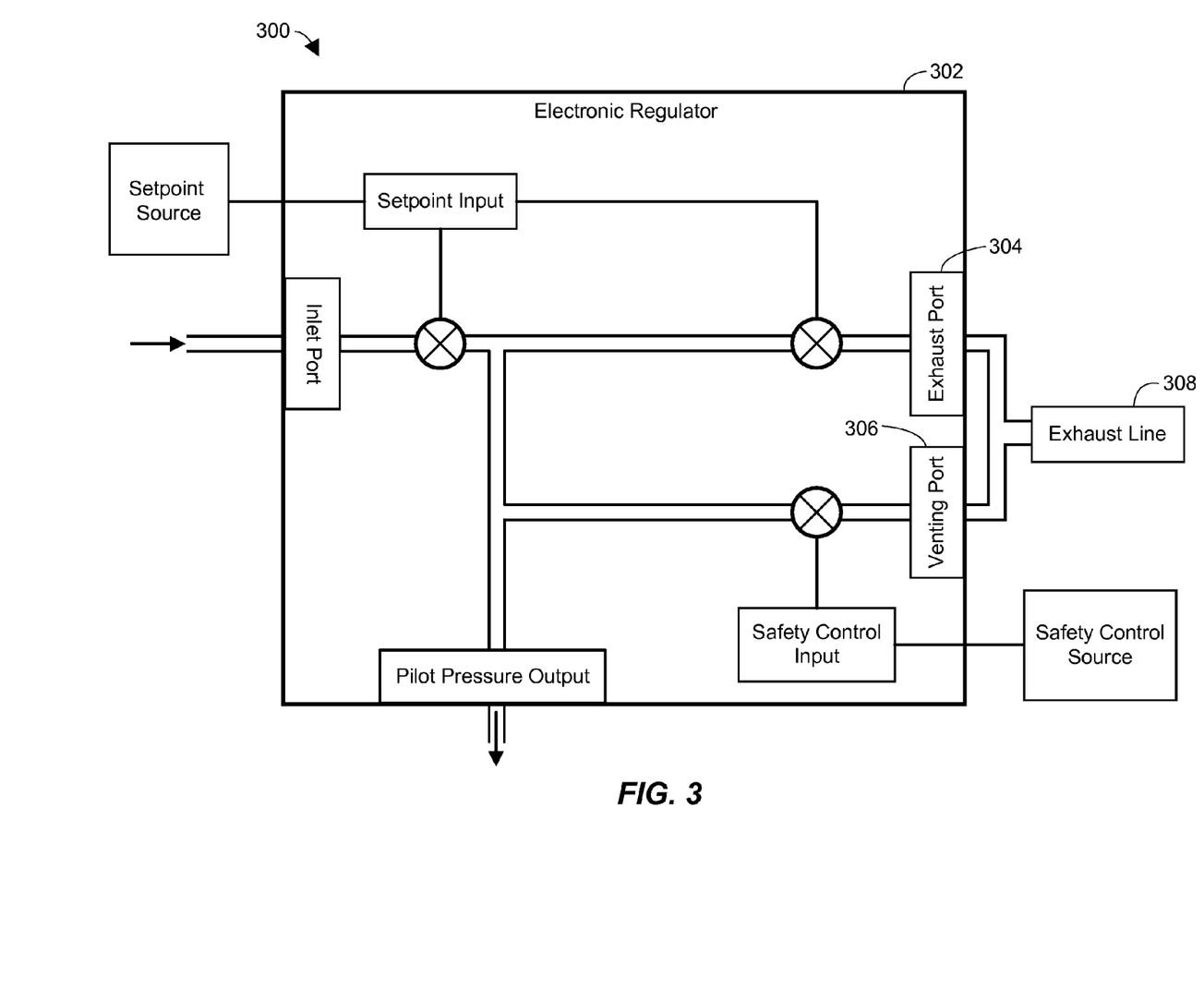
FIG. 3 is a block diagram of another example electronic regulator including an integral vent valve and a common exhaust line.

Referring now to FIG. 3, yet another example system 300 constructed in accordance with an embodiment of the present disclosure includes an electronic regulator 302. As with the example system 200, the electronic regulator 302 generally includes components similar to the components of electronic regulator 102. However, the electronic regulator 302 may also be specially configured for operating with hazardous materials and/or in hazardous environments, such as when compressed natural gas (CNG) is used to produce the pilot or other pressure. To this end, exhaust released via an exhaust port 304 and vented pilot pressure released via a venting port 306 may be ported into a common exhaust line 308, rather than being vented to the atmosphere. Media in the exhaust line 308 may be processed so as to comply with regulatory or governmental restrictions (e.g., environmental or safety restrictions).

Figure 4:
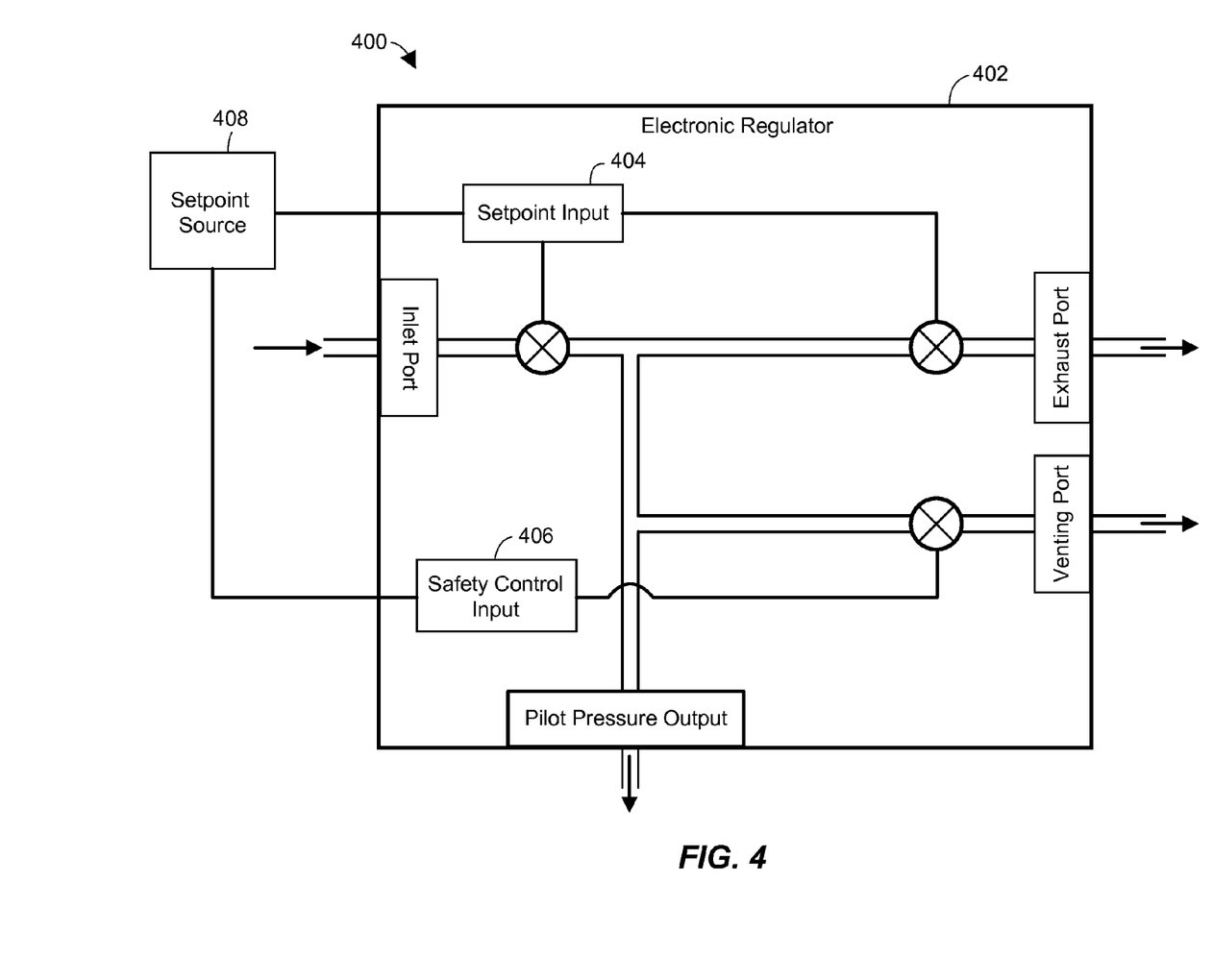
FIG. 4 is a block diagram of another example electronic regulator including an integral vent valve which receives setpoint signals and safety control signals from a common source.

FIG. 4 illustrates another example system 400 including an electronic regulator 402 with a setpoint input 404 and a safety control input 406 similar to that of the electronic regulator 102. As discussed above, independent control of a setpoint input 404 and a safety control input 406 may be advantageous in some applications, but certain implementations, such as the system 400, may include a common source of setpoint signals and safety control signals (e.g., a setpoint source 408). Such an implementation may provide quick setup and installation, for example.

The setpoint source 408 may execute one or more software applications to generate setpoint signals and safety control signals. In certain implementations, the setpoint source 408 may utilize two different software applications to generate setpoint signals and safety control signals, respectively, thus allowing the signals to be virtually independent. However, in other implementations, the setpoint signals and safety control signals may be generated by the same software application.

Figure 5:
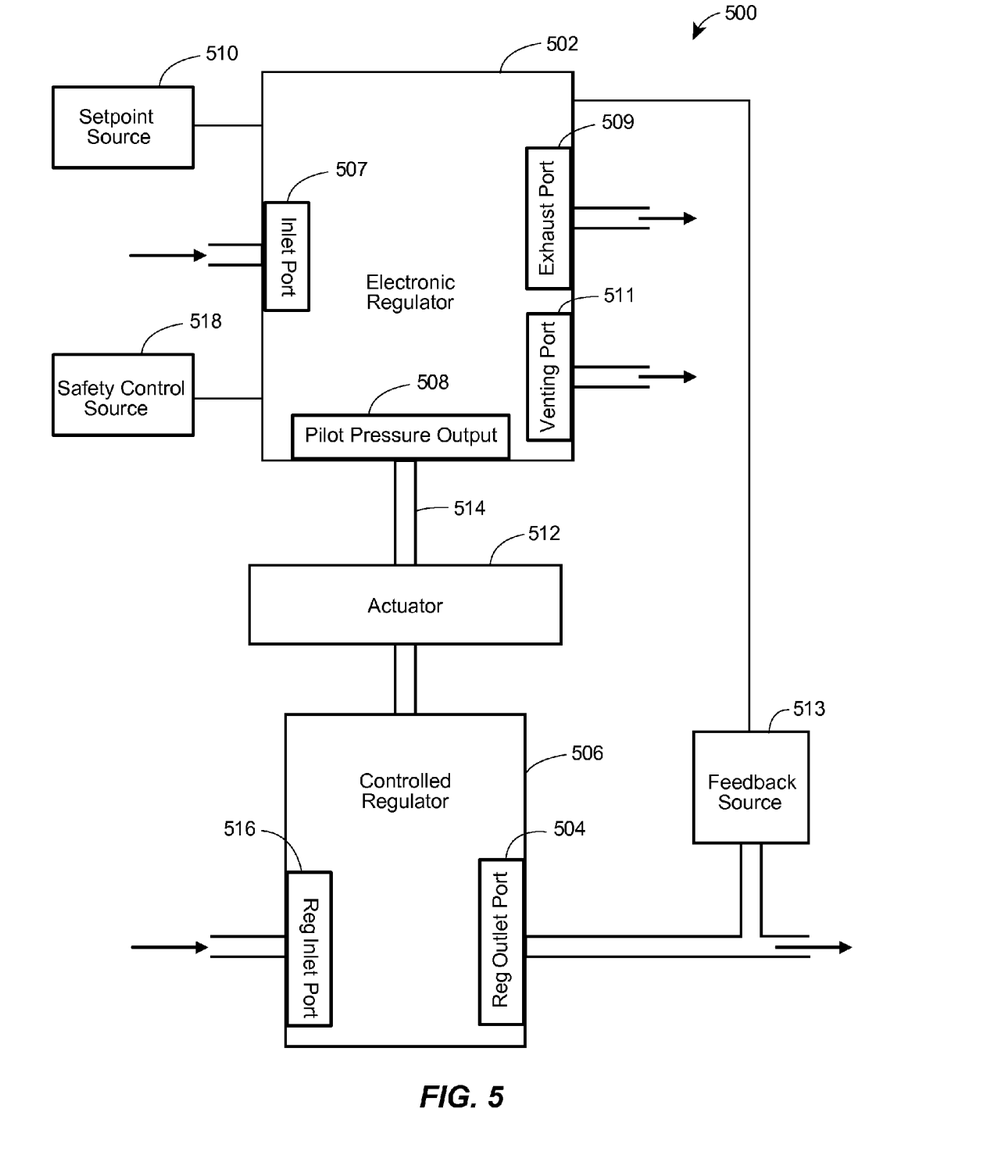
FIG. 5 is an example system in which an electronic regulator, such as the electronic regulator illustrated in FIG. 1, controls a controlled regulator.

FIG. 5 is a block diagram of an example process control system 500 in which an electronic regulator 502 controls a pressure at a regulator outlet port 504 of a controlled regulator 506, such as a pneumatically actuated regulator. For ease of discussion, the electronic regulator 502 is illustrated in FIG. 5 as including only an inlet port 507, a pilot pressure output 508, an exhaust port 509, and a venting port 511. However, it is understood that the electronic regulator 502 may include substantially the same components as any one of the electronic regulators 102, 202, 302, and 402.

The electronic regulator 502 may produce a pilot pressure at the pilot pressure output 508 according to a set point signal received from a setpoint source 510 and, in some cases, a feedback signal from the feedback source 513. The pilot pressure may flow into an actuator 512 via a direct coupling 514, and the actuator 512 may operate valves, pistons, or other elements of the controlled regulator 506 based on the pilot pressure so as to control the pressure at the regulator outlet port 504. For example, the actuator 512 may be coupled to a dome or air actuator cavity of the controlled regulator 506, and may operate an inlet valve (e.g., coupled to a regulator inlet port 516) so as to increase or decrease the pressure at the regulator outlet port 504.

The electronic regulator 502 may vent the pilot pressure (e.g., through the venting port 511) according to a safety control signal from a safety control source 518. In this manner, the pilot pressure may be vented in an emergency or other shutoff situation without the need for an external venting valve in, for example, the direct coupling 514. The direct coupling 514 between the electronic regulator 502 and the actuator 512 may be air tight. That is, the direct coupling 514 may not include any leak points, such as valves or other openings through which gases or fluids may flow.

Figure 6A:
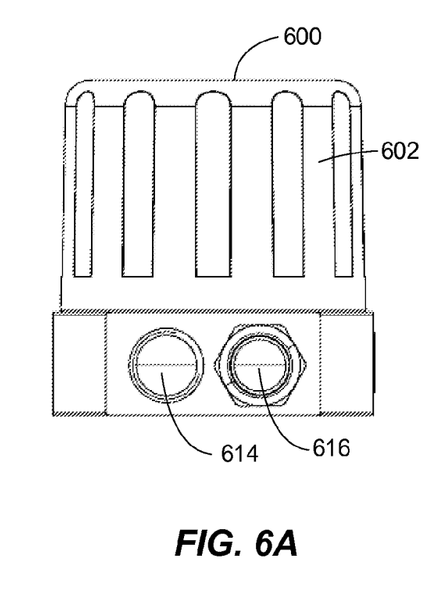
FIG. 6A-6C are schematic views of the exterior of an example electronic regulator such as the electronic regulator illustrated in FIG. 1.
Figure 6B:
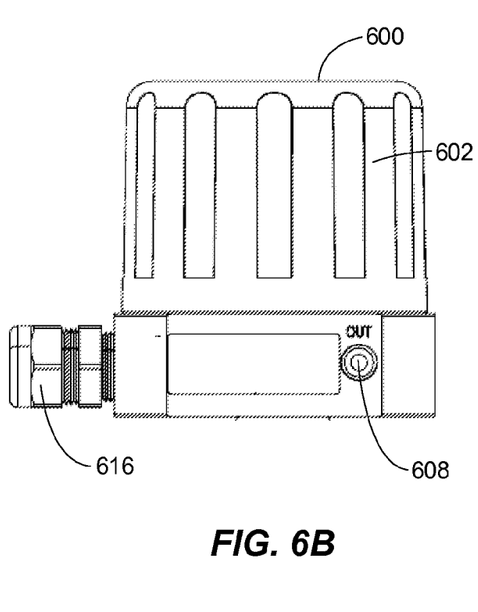
Figure 6C:
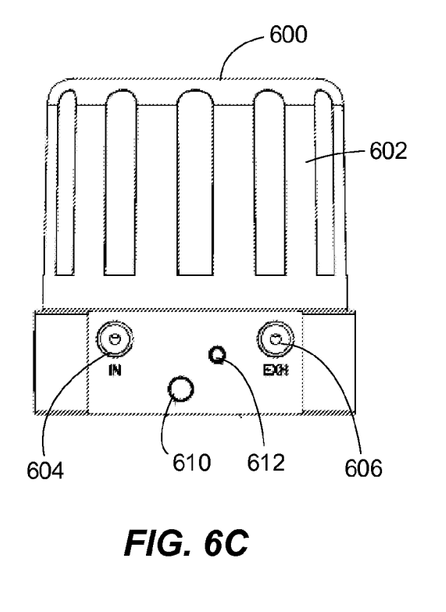

FIGS. 6A-6C are schematic illustrations of the exterior of an example electronic regulator 600 in a regulator housing 602. Any one of the electronic regulators 102, 202, 302, 402, or 502 may be physically constructed as shown in FIGS. 6A-6C. It is understood, however, that an electronic regulator of the present disclosure may be constructed with any suitable physical shape and arrangement of parts.

The electronic regulator 600 may include an inlet port 604 and an exhaust port 606 operatively coupled to an internal inlet valve and exhaust valve, as further discussed with reference to FIG. 1 and FIG. 7. The inlet port 604 and the exhaust port 606 may be configured to accept any suitable type of fitting and/or hose, line, or pipe, such as a ⅛" NPTF fitting. The electronic regulator 600 may also include other ports or interfaces, such as a gauge port 608 (e.g., for attaching an external pressure gauge), an atmospheric reference 610 for one or more internal sensors, and a venting port 612 for venting a pilot pressure (e.g., when a vent valve, such as the vent valve 122, is open).

The electronic regulator 600 may be communicatively coupled to a setpoint source and/or a safety control source via a conduit for external wiring 614. The conduit for external wiring 614 may house one or more cables, such as USB cables, and, in some cases, include a strain relief component to prolong the life of the housed cables. Although the electronic regulator 600 is illustrated as having one conduit for external wiring 614, it is understood that wiring facilitating communications with a setpoint source may be housed in a different conduit than that of wiring facilitating communications with a safety control source. Also, the electronic regulator 600 may include one or more conduits for internal wiring 616 housing wiring between internal regulator elements, such as valves, microprocessors, memories, or other circuit components.

Figure 7:
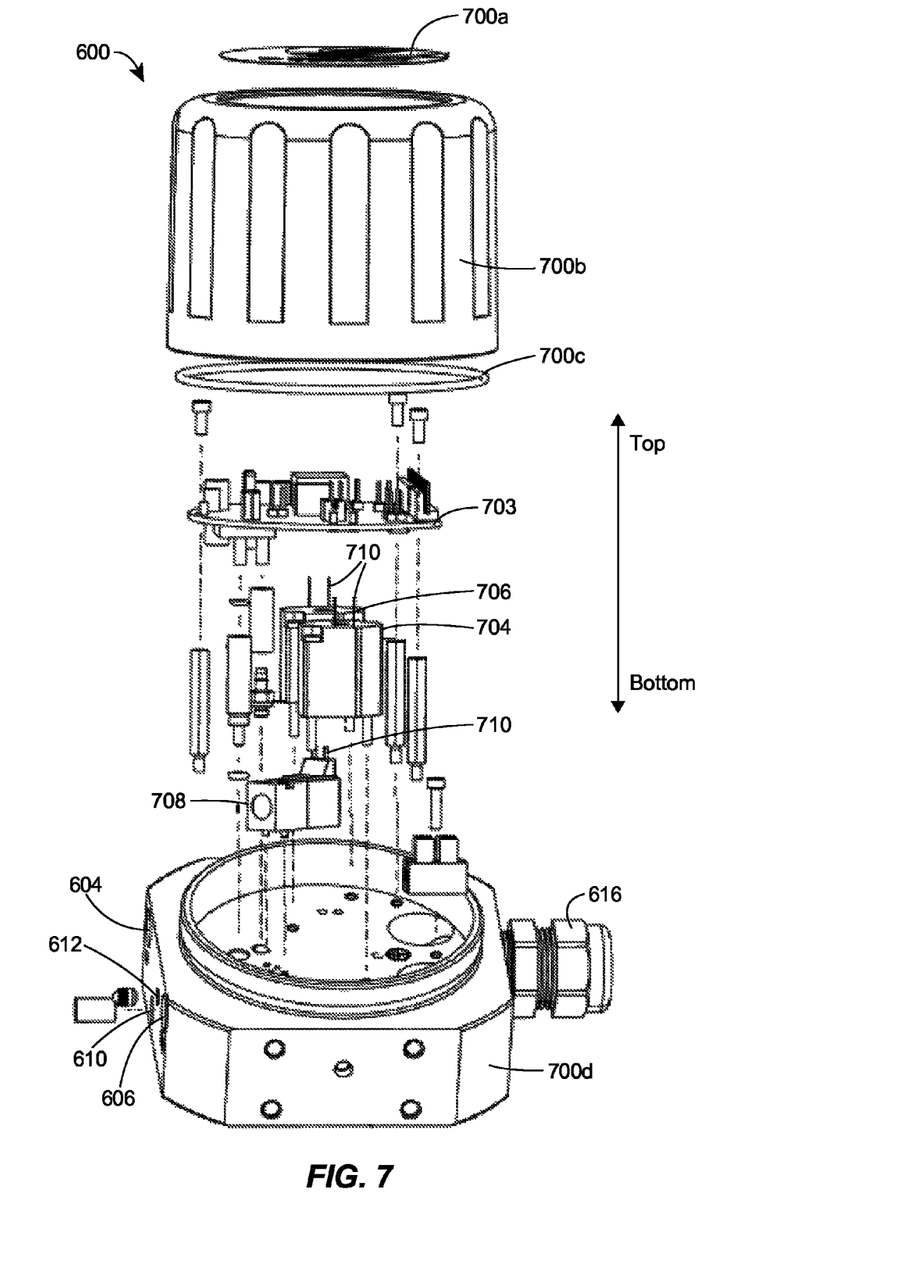
FIG. 7 is an exploded view of the example electronic regulator illustrated in FIGS. 6A-6C.

FIG. 7 illustrates an exploded view of the electronic regulator 600. The regulator housing 602 of the electronic regulator 600 may include one or more housing components 700a-700d. The one or more housing components 700a-700d may attach to one another via threads, screws, glue, O-rings, etc., and some or all of the one or more housing components 700a-700d, such as the housing component 700d, may contain integral (e.g., machined) lines, ports, fittings, chambers, etc. couplable to other internal and/or external components, such as valves.

In some implementations, the electronic regulator 600 may include one or more circuit boards 703, or electronic circuit components. The circuit boards 703 may include various circuit components, such as microprocessors, computer readable memory (e.g., random access memory, readonly memory, Flash memory, etc.), integrated circuits, light emitting diodes, power supplies, batteries, cable connections, etc., which allow the electronic regulator 600 to operate based on setpoint signals, safety control signals, and/or feedback signals. Components of the circuit board may be powered by a cable entering the regulator housing 602 through the conduit for external wiring 614 and may receive setpoint, feedback, and/or safety control signals by one or more other cables entering the regulator housing 602 through the conduit for external wiring 614. It is clear, however, that one cable, such as a USB cable, may both power the circuit boards 703 and provide signals to the circuit boards 703.

The electronic regulator 600 may also include an exhaust valve 704, an inlet valve 706, and a vent valve 708. The exhaust valve 704, the inlet valve 706, and the vent valve 708 may include one or more electronic leads 710 couplable to the circuit boards 703, such that the exhaust valve 704, the inlet valve 706, and the vent valve 708 may be operated according to received setpoint, feedback, and safety control signals.

The exhaust valve 704, the inlet valve 706, and the vent valve 708 are disposed inside the regulator housing 602 (i.e. integral to the electronic regulator 600). In this manner, the electronic regulator 600 may both control a pilot pressure based on a setpoint signal and vent that pilot pressure based on a safety control signal without the need for an external vent valve (e.g., in a coupling to an actuator). Wiring facilitating operation of the exhaust valve 704, the inlet valve 706, and the vent valve 708 may be housed within a common housing (e.g., the conduit 614). A common housing for wiring may allow for a robust physical construction and application of the electronic regulator 600 lacking unprotected or exposed external wiring.

Figure 8A:
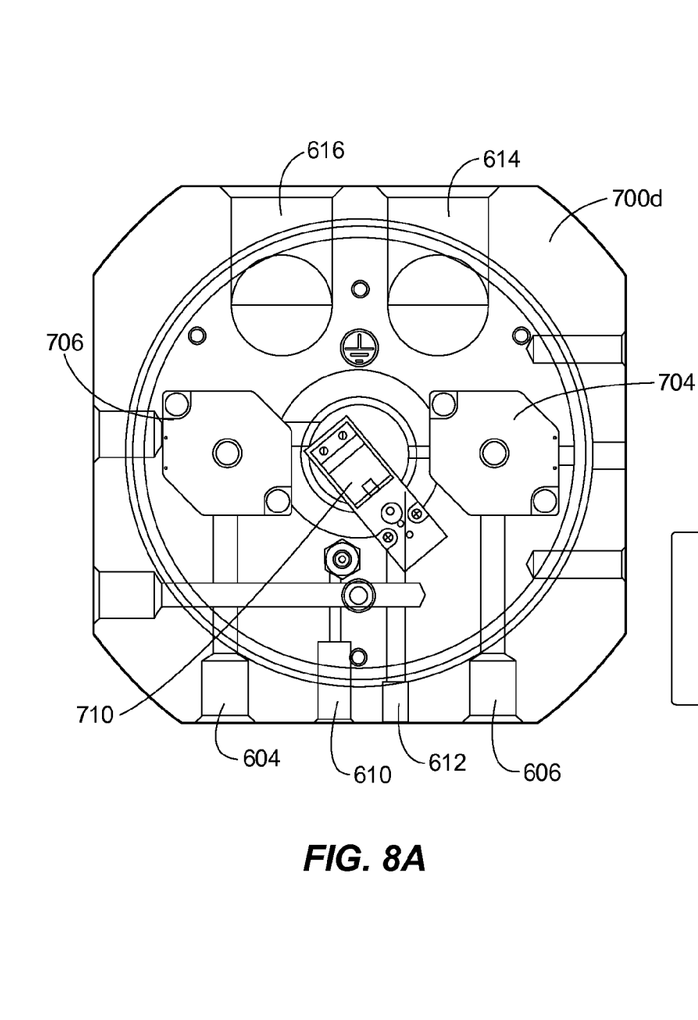
FIGS. 8A and 8B are cutaway views of portions of the example electronic regulator illustrated in FIGS. 6A-6C.
Figure 8B:
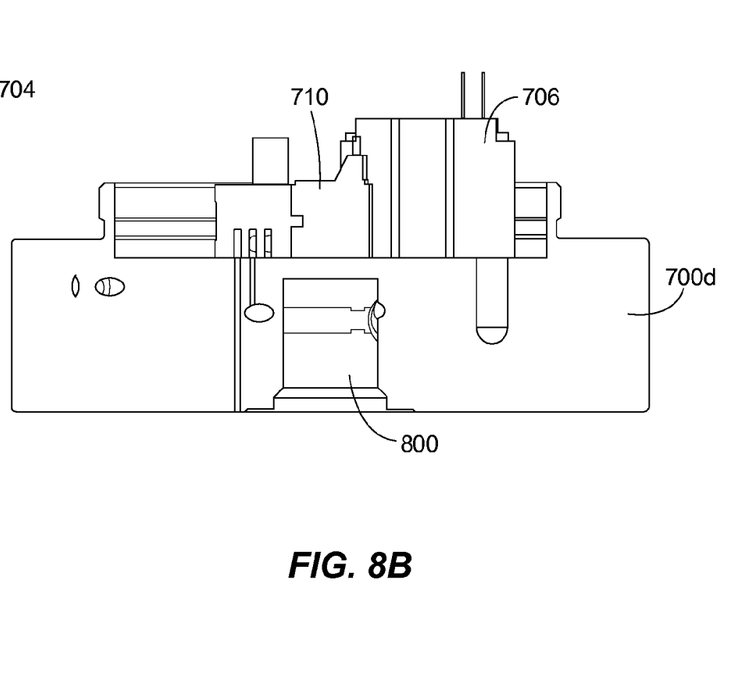

FIGS. 8A and 8B present cutaway views of a portion of the example electronic regulator 600. Specifically, FIG. 8A is a cutaway view of the housing component 700d of FIG. 7 from a top-down perspective (from the top of the electronic regulator 600, as illustrated in FIG. 7). FIG. 8A also illustrates a top-down view of the exhaust valve 704, the inlet valve 706, and the vent valve 710 and the corresponding exhaust port 606, inlet port 604, and vent port 612.

FIG. 8B illustrates a side cutaway view of the housing component 700d in which a pilot pressure output 800 is visible. The electronic regulator 600 may operate the inlet valve 706 and the exhaust valve 704 (e.g., via the circuit boards 703 and received setpoint/feedback signals) to generate a pilot pressure at the pilot pressure output 800. In some scenarios the pilot pressure output 800 may be directly coupled to an actuator, via a ½" SAE fitting, for example, such that the pilot pressure flows into the actuator.

Although not shown in FIGS. 6A-6C, 7, and 8A-8B, the electronic regulator 600 may also include one or more lights, such as light emitting diodes (LEDs), to indicate diagnostic information. The one or more lights may be disposed on the exterior of the regulator housing 602 or may be disposed on any suitable one or more of the components housed within the regulator housing 602. In an emergency or other shutoff situation in which a vent valve releases a pilot pressure, the one or more lights may indicate diagnostic information, such as a reasons for venting, error codes, level of risk, etc.

Figure 9:
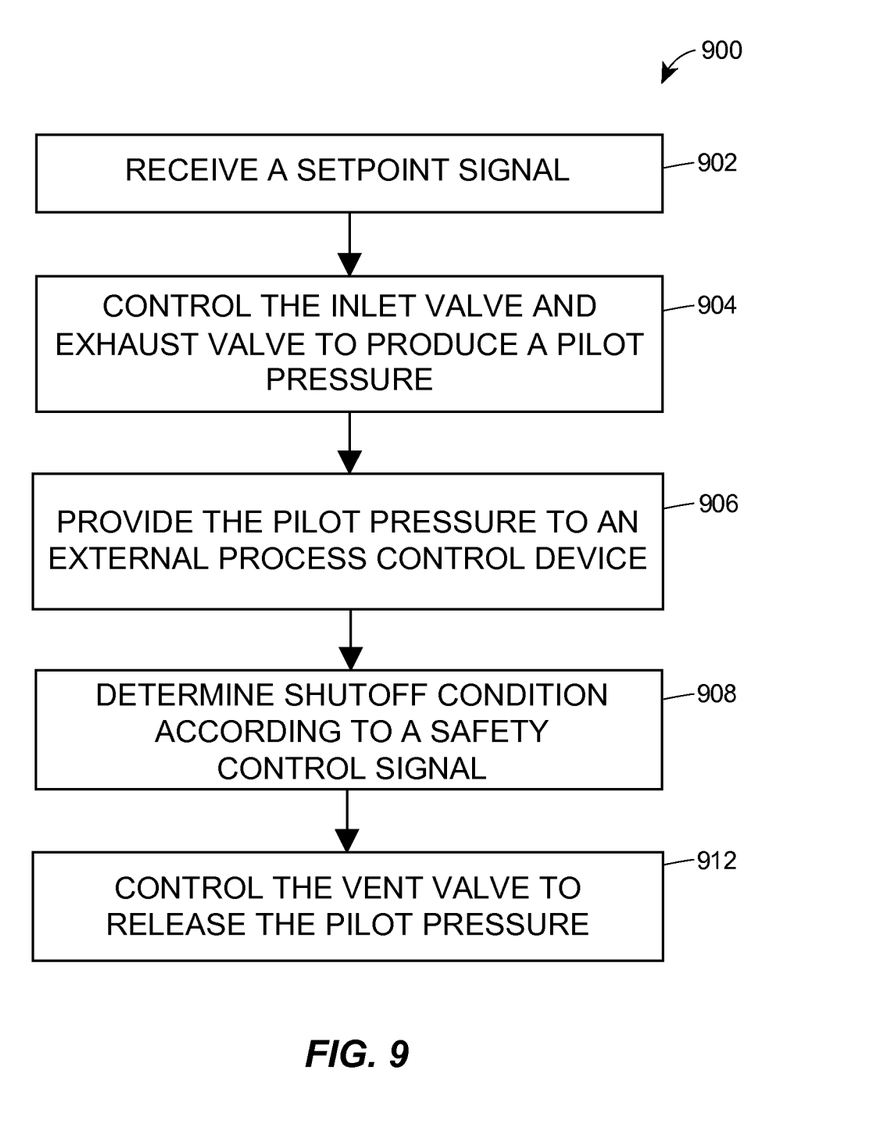
FIG. 9 is a flow diagram of an example method of venting a pilot pressure in an electronic regulator which may be implemented in electronic regulator illustrated in FIG. 1.

FIG. 9 is a flow diagram of an example method 900 of venting a pilot pressure in an electronic regulator housed in a regulator housing. The method 900 may be implemented by any one of the electronic regulators 102, 202, 302, or 402, for example.

To begin, an electronic regulator, such as the electronic regulator 102, receives a (block 902). The setpoint source 104, for example, may communicate the setpoint signal to the setpoint input 108 of the electronic regulator 102. The setpoint signal may include any suitable combination of digital and/or analog signals generated by the setpoint source 104 and indicative of a setpoint value (e.g., a pressure value).

A control algorithm (e.g., implementing control logic and executed by a processor of an electronic regulator) controls an inlet valve and exhaust valve to produce a pilot pressure at a pilot pressure output (block 904). As discussed further with reference to FIG. 1, the electronic regulator 102 may operate the inlet valve 116 and/or exhaust valve 118 to produce a pilot pressure at the pilot pressure output 110. A specific pilot pressure may be produced based on the received setpoint signal, and, in some cases, a received feedback signal.

The pilot pressure may be provided to an actuator to control an external process control device (block 906), such as a pneumatically controlled regulator. The pilot pressure may cause the external process control device to precisely output a value, such as a pressure, volume, temperature, etc., according to the setpoint value.

A safety control input (e.g., of the electronic regulator 102) may receive a safety control signal (block 908). The safety control source 106 may send the safety control signal to the safety control input of the electronic regulator 102, and the safety control signal may include any suitable analog or digital signal. In some implementations, the safety control source 106 may provide the safety control signal directly to the vent valve 122. In other implementations, the safety control source 106 may provide the safety control signal to a safety control input (e.g., in the circuit boards 703), and a microprocessor of the electronic regulator 102 may process the safety control signal to operate the vent valve 122. According to the safety control signal, the vent valve 122 may then be controlled to vent, or release, the pilot pressure (block 912). In some cases, the vent valve 122 operates to vent the pilot pressure in an absence of the safety control signal, and, in other cases, the vent valve 122 operates to vent the pilot pressure upon receiving the safety control signal.

For example, the vent valve 122 may be a normally open valve that may open to release the pilot pressure upon a loss of a safety control signal, and the vent valve 122 may remain closed while a safety control signal is supplied to the vent valve. Alternatively, the vent valve 122 may be a normally closed valve that opens upon receiving the safety control signal. Generally, the vent valve 122 may open and/or close based on any suitable type of safety control signal, or lack thereof.

What is claimed is:
1. An electronic regulator comprising:
an inlet valve disposed within a regulator housing coupled to an inlet port, the inlet port configured to receive a supply pressure;
an exhaust valve disposed within the regulator housing and coupled to an exhaust port, the exhaust port configured to release a pilot pressure when the exhaust valve is open;
a pilot pressure output pneumatically coupled to the inlet valve and exhaust valve, the pilot pressure output configured to be coupled to an external process control device to provide the pilot pressure to the external process control device;

a setpoint input coupled to both the inlet valve and the exhaust valve and configured to receive a setpoint signal indicative of a setpoint value, wherein the electronic regulator operates the inlet valve and the exhaust valve to control the pilot pressure according to the setpoint value;

a vent valve disposed within the regulator housing and coupled to a venting port and pneumatically coupled to the pilot pressure output, the inlet valve, and the exhaust valve, the venting port configured to release the pilot pressure when the vent valve is open; and a safety control input coupled to the vent valve and configured to receive a safety control signal, wherein the vent valve operates to release the pilot pressure, according to the safety control signal, when the inlet valve and the exhaust valve are in a closed configuration.

2. The electronic regulator of claim 1, wherein the safety control input is coupled to a safety control source, the safety control source generating the safety control signal, and wherein the setpoint input is coupled to a setpoint source different from the safety control source, the setpoint source generating the setpoint signal indicative of the setpoint value.

3. The electronic regulator of claim 1, wherein the safety control input and the setpoint input are coupled to a setpoint source, the setpoint source generating both the setpoint signal indicative of the setpoint value and the safety control signal.

4. The electronic regulator of claim 1, wherein the vent valve operates to release the pilot pressure in the absence of the safety control signal.

5. The electronic regulator of claim 1, further comprising a feedback input configured to receive a feedback signal, wherein the electronic regulator operates the inlet valve and the exhaust valve to control the pilot pressure according to the setpoint value and the feedback signal.

6. The electronic regulator of claim 5, wherein the electronic regulator is a proportional-integral-derivative (PID) controller that operates the inlet valve and exhaust valve based on a control loop feedback mechanism.

7. The electronic regulator of claim 1, wherein the exhaust port and the venting port are coupled to an exhaust line for processing media released from the exhaust port and the venting port.

8. The electronic regulator of claim 1, further comprising a connection housing, wherein the connection housing encloses the couplings between (i) the vent valve and the safety control input, (ii) the inlet valve and the setpoint input, and (iii) the exhaust valve and the setpoint input.

9. The electronic regulator of claim 1, further comprising one or more lights disposed on one of a housing of the electronic regulator or the vent valve, the one or more lights indicating diagnostic information related to the shutoff signal.

10. A system for controlling a regulator outlet pressure, the system comprising:

an electronic regulator housed in a regulator housing, the electronic regulator comprising:

an inlet valve disposed within the regulator housing coupled to an inlet port, the inlet port configured to receive a supply pressure;

an exhaust valve disposed within the regulator housing and coupled to an exhaust port, the exhaust port configured to release a pilot pressure when the exhaust valve is open;

a pilot pressure output pneumatically coupled to the inlet valve and exhaust valve, the pilot pressure output coupled to an actuator to provide the pilot pressure to the actuator;

a setpoint input coupled to both the inlet valve and the exhaust valve and configured to receive a setpoint signal indicative of a setpoint value, wherein the electronic regulator operates the inlet valve and the exhaust valve to control the pilot pressure according to the setpoint value;

a vent valve disposed within the regulator housing and coupled to a venting port and pneumatically coupled to the pilot pressure output, the inlet valve, and the exhaust valve, the vent valve being disposed upstream of the venting port, the venting port configured to release the pilot pressure when the vent valve is open; and a safety control input coupled to the vent valve and configured to receive a safety control signal, wherein the vent valve operates to release the pilot pressure, according to the safety control signal, when the inlet valve and the exhaust valve are in a closed configuration; and a pressure regulator having a pressure regulator inlet valve, a pressure regulator outlet valve, and a control element, the pressure regulator coupled to the actuator such that the control element controls the regulator outlet pressure according to the pilot pressure of the electronic regulator.

11. The system of claim 10, wherein the safety control input is coupled to a safety control source, the safety control source generating the safety control signal, and wherein the setpoint input is coupled to a setpoint source different from the safety control source, the setpoint source generating the setpoint signal indicative of the setpoint value.

12. The system of claim 10, wherein the safety control input and the setpoint input are coupled to a setpoint source, the setpoint source generating both the setpoint signal indicative of the setpoint value and the safety control signal.

13. The system of claim 10, wherein the electronic regulator further comprises a feedback input configured to receive a feedback signal, wherein the electronic regulator operates the inlet valve and the exhaust valve to control the pilot pressure according to the setpoint value and the feedback signal.

14. The system of claim 10, wherein the exhaust port and the venting port are coupled to an exhaust line for processing media released from the exhaust port and the venting port.

15. The system of claim 10, wherein the electronic regulator further includes a connection housing, wherein the connection housing encloses the couplings between (i) the vent valve and the safety control input, (ii) the inlet valve and the setpoint input, and (iii) the exhaust valve and the setpoint input.

16. The system of claim 10, wherein the electronic regulator further includes one or more lights disposed on one of a housing of the electronic regulator or the vent valve, the one or more lights indicating diagnostic information related to the shutoff signal.

17. A method of venting a pilot pressure in an electronic regulator housed in a regulator housing, the method comprising:

receiving at a setpoint input, from a setpoint source, a setpoint signal indicative of a setpoint value;

controlling an inlet valve within the regulator housing and an exhaust valve within the regulator housing, based on the setpoint value, to produce a pilot pressure at a pilot pressure output of the electronic regulator, the pilot pressure output pneumatically coupled to the inlet valve and exhaust valve;

providing the pilot pressure to an external process control device via the pilot pressure output;

receiving, from a safety control source, a safety control signal; and controlling a vent valve within the regulator housing, according to the safety control signal, to release the pilot pressure through a venting port of the electronic regulator when the inlet valve and the exhaust valve are in a closed configuration.

18. The method of claim 17, wherein the setpoint source operates independently of the safety control source.

19. The method of claim 17, further comprising:

receiving, from a feedback source, a feedback signal indicating a measured value of a controlled pressure; and controlling the inlet valve within the regulator housing and the exhaust valve within the regulator housing, based on the feedback signal and the setpoint value, to produce the pilot pressure at a pilot pressure output of the electronic regulator.

20. The method of claim 17, further comprising indicating, via one or more lights at the electronic regulator, diagnostic information related to the shutoff signal.

21. The method of claim 17, wherein controlling the vent valve, according to the safety control signal, to release the pilot pressure through a venting port of the electronic regulator comprises releasing the pilot pressure through the venting port in the absence of the safety control signal.

* * * * *